UNITED STATES PATENT OFFICE.

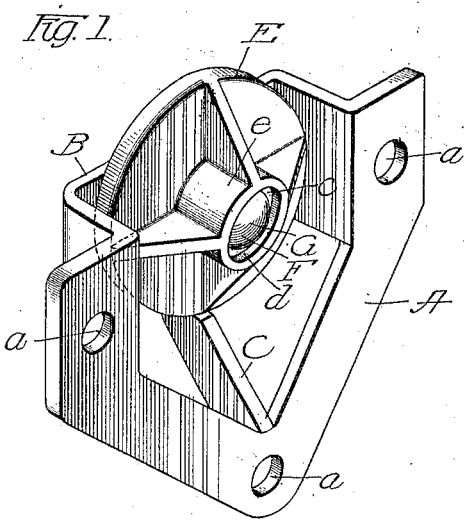
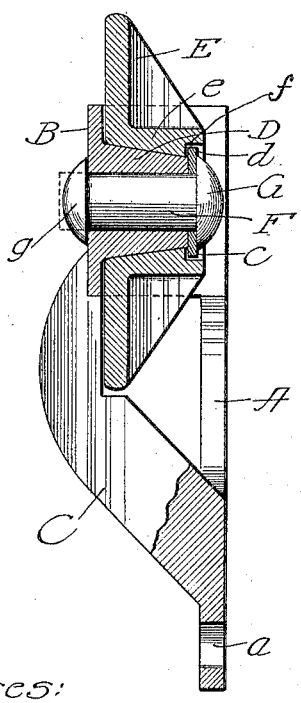

FRED MATHEWS, OF CHICAGO, ILLINOIS, ASSIGNOR TO UNION METAL PRODUCTS COMPANY, A CORPORATION OF DELAWARE.

BRACKET FOR CAR-DOORS.

1,322,037.　　　　Specification of Letters Patent.　　Patented Nov. 18, 1919.

Application filed September 30, 1918. Serial No. 256,322.

*To all whom it may concern:*

Be it known that I, FRED MATHEWS, a citizen of the United States, residing at Chicago, in the county of Cook and State of Illinois, have invented new and useful Improvements in Brackets for Car-Doors, of which the following is a full, clear, and exact description.

My invention relates to brackets for sliding car doors, and particularly to the means for retaining the rollers used in connection therewith on the journaling element of said brackets.

The object of my invention is to so construct the supporting-frame of the bracket and to so retain the roller on the journaling stud or member of the same as to guard said rollers from blows struck endwise at the same and so as to greatly reduce the weight of said bracket and the labor involved in assembling the same, and thus greatly reduce the cost of manufacture thereof. This I accomplish by the means hereinafter fully described, and as particularly pointed out in the claims.

In the drawings:

Figure 1 is a perspective view of my improved car bracket looking at it from the rear.

Fig. 2 is a vertical transverse section thereof.

Referring to the drawings, A represents a V-shaped supporting-plate having openings $a$, $a$, $a$, at the upper ends of its arms and at the angle of convergence thereof through which rivets or bolts (not shown) are inserted to secure the bracket to the side of the car in the usual manner. The upper vertically extended ends of said arms are connected by a forwardly projecting yoke B, which, preferably, is shaped so as to correspond to three sides of a rectangular figure. The front stretch of this yoke is parallel to the outer face of supporting-plate A, and midway its length its lower edge is connected by a strut C with the angle of plate A.

The front stretch of yoke B is provided, midway between its ends, with an inwardly projecting tubular journaling stud D the inner end of which is foreshortened so that it does not come in contact with the side of the car when the bracket is attached thereto, and its outer circumference is, preferably, tapered from the front stretch of the yoke toward its said inner end. A roller E of suitable diameter less than the distance between the ends of said yoke is journaled on stud D and the bore of roller E and the hub $e$ projecting inward therefrom is the obverse of the tapered stud D. Hub $e$ projects toward the side of the car slightly farther than stud D and its inner end $f$ is rabbeted, and the roller is retained on stud D by means of a washer $c$, which is greater in diameter than the inner end of said stud and is seated in and laps against the shoulder of said rabbeted end and is itself retained in position concentric with said roller by a rivet F.

The barrel of this rivet F is slightly greater in length that the distance between the outer surface of the front stretch of the yoke and the inner surface of washer $c$, and when roller E is mounted on stud D and washer $c$ is assembled in against the inner end of stud D the barrel of said rivet is inserted through the plane of the stud from the roller until the shoulder of the head G on its inner end comes in contact with the washer, whereupon the outer end of the barrel of the rivet is swaged to form an outer head $g$ and thus retain the washer and roller in their proper assembled positions.

The depth of the rabbet $f$ in the inner end of hub $e$ is such that the length of the journaling surface of the hub of the roller is slightly less than the bearing surface of stud D upon which it revolves. This will permit of the free revolution of the roller without interference from the washer.

What I claim as new is:

1. A bracket for car doors comprising a supporting-plate, a member projecting forward therefrom, a hollow journaling stud projecting inwardly from said member, a roller journaled on said stud, and a rivet inserted through said stud and headed at both ends to retain the roller on the stud.

2. A bracket for car doors comprising a supporting-plate, a member projecting forward therefrom, a hollow journaling stud projecting laterally inwardly from said member, a roller journaled on said stud, and a rivet inserted outwardly through said stud until the head thereof laps over the inner margins of the bore thereof and having a head swaged over the edges of the outer end of the bore of said stud.

3. A bracket for car doors comprising a supporting-plate, a member projecting forward therefrom, a hollow journaling stud projecting inward from said member and foreshortened, substantially as described, a roller journaled on said stud, a rivet inserted outwardly through the same until the head thereof laps over the inner end of said stud, and a head swaged over the edges of the outer end of the bore of the stud.

4. A bracket for car doors comprising a V-shaped supporting-plate, a yoke the ends of which are integral with and which projects outward from the ends of said plate, a hollow stud made integral with and projecting inward laterally from the center of length of the yoke and foreshortened, a roller journaled on said stud, and a rivet inserted outwardly through said stud until the head laps over the inner end of said stud, which rivet has its outer end provided with a swaged head.

5. A bracket for car doors comprising a V-shaped supporting-plate, a yoke the ends of which are integral with and which projects outward from the ends of said plate, a hollow stud made integral with and projecting inward laterally from the center of length of the yoke and foreshortened, a roller journaled on said stud the inner end of the hub of which is interiorly rabbeted, a washer seated in the rabbet so produced, and a rivet inserted outwardly through said washer and stud until the head laps against the inner surface of the washer which rivet has its outer end provided with a swaged head.

In witness whereof I have hereunto set my hand this 15th day of September, 1918.

FRED MATHEWS.

Witnesses:
J. E. EHLER,
FRANK D. THOMASON.